United States Patent
Cadeau et al.

(10) Patent No.: US 9,822,976 B2
(45) Date of Patent: Nov. 21, 2017

(54) GAS VALVE UNIT

(71) Applicant: BSH Hausgeräte GmbH, Munich (DE)

(72) Inventors: Christophe Cadeau, Strasbourg (FR); Jörn Naumann, Durbach (DE)

(73) Assignee: BSH Hausgeräte GmbH, Munich (DE)

( * ) Notice: Subject to any disclaimer, the term of this patent is extended or adjusted under 35 U.S.C. 154(b) by 102 days.

(21) Appl. No.: 14/771,216

(22) PCT Filed: Feb. 26, 2014

(86) PCT No.: PCT/EP2014/053726
§ 371 (c)(1),
(2) Date: Aug. 28, 2015

(87) PCT Pub. No.: WO2014/139798
PCT Pub. Date: Sep. 18, 2014

(65) Prior Publication Data
US 2016/0010858 A1     Jan. 14, 2016

(30) Foreign Application Priority Data

Mar. 13, 2013 (EP) .................................... 13290052

(51) Int. Cl.
| | |
|---|---|
| *F16K 3/02* | (2006.01) |
| *F16K 25/00* | (2006.01) |
| *F16K 31/44* | (2006.01) |
| *F23N 1/00* | (2006.01) |
| *F23D 14/34* | (2006.01) |
| *F23D 14/36* | (2006.01) |

(52) U.S. Cl.
CPC ............ *F23N 1/007* (2013.01); *F16K 3/0218* (2013.01); *F16K 3/0254* (2013.01); *F16K 25/005* (2013.01); *F16K 31/44* (2013.01);
*F23D 14/34* (2013.01); *F23D 14/36* (2013.01); *F23N 2035/24* (2013.01)

(58) Field of Classification Search
CPC .......... F23D 14/36; F23D 14/34; F23N 1/007; F23N 2031/00; F16K 3/0254; F16K 25/005; F16K 31/44; F16K 17/406; F16K 3/0218
USPC ............... 251/66–75, 251; 137/67, 68.17, 71
See application file for complete search history.

(56) References Cited

U.S. PATENT DOCUMENTS

| | | | |
|---|---|---|---|
| 2003/0047571 A1* | 3/2003 | Ramsey | ............. B05B 11/3077 222/321.9 |
| 2013/0240767 A1 | 9/2013 | Naumann | |

FOREIGN PATENT DOCUMENTS

| | | |
|---|---|---|
| CN | 2182307 Y | 11/1994 |
| CN | 2387396 Y | 7/2000 |

(Continued)

OTHER PUBLICATIONS

National Search Report CN 201480014442 dated Sep. 21, 2016.
International Search Report PCT/EP/2014/053726 dated May 28, 2014.

*Primary Examiner* — Marina Tietjen
(74) *Attorney, Agent, or Firm* — Michael E. Tschupp; Andre Pallapies; Brandon G. Braun

(57) ABSTRACT

A gas valve unit for controlling a gas throughput routed to a gas burner of a gas appliance includes a valve housing, an actuation shaft which is able to set an opening cross section of the gas valve unit, and a stop valve. A linearly-displaceable connection element transmits a movement of the actuation shaft to the stop valve. The connection element has a plastic bend forming an overpressure protection.

29 Claims, 3 Drawing Sheets

(56) References Cited

FOREIGN PATENT DOCUMENTS

| | | | | |
|---|---|---|---|---|
| CN | 2396298 | Y | 9/2000 | |
| CN | 2418337 | Y | 2/2001 | |
| DE | WO 2012080055 | A2 * | 6/2012 | ............. F23K 5/007 |
| EP | 1909029 | A2 | 4/2008 | |
| PL | 159416 | B1 | 12/1992 | |
| WO | 2006021775 | A1 | 3/2006 | |

* cited by examiner

GAS VALVE UNIT

BACKGROUND OF THE INVENTION

The invention relates to a gas valve unit for controlling gas throughput guided to a gas burner of a gas device, in particular a gas cooking appliance, wherein the gas valve unit has an actuation mechanism for a magnetic valve.

In this invention the gas valve unit has a valve housing and an actuation shaft for adjusting an opening cross section of the gas valve unit and an additional stop valve, wherein a movement of the actuation shaft is able to be transmitted to the stop valve by means of a linearly-displaceable connection element.

Gas valve units of the said type with a stop valve are frequently also referred to as safety gas valves. As a rule a rotary knob with an actuation shaft is pushed onto a control section of the gas valve unit, which an operator of the gas cooking appliance can access manually. The opening cross section of the gas valve unit is generally adjusted by turning the actuation shaft. The stop valve can be opened by the operator by axial displacement of the actuation shaft, in that they push on the rotary knob. The axial movement of the actuation shaft is transmitted to a linearly-displaceable connection element. This movement of the actuation shaft can be transmitted to the connection element directly or indirectly, for example via a device for redirecting the direction of movement. The connection element is in contact directly or indirectly with a stop element of the stop valve. With an axial movement of the connection element in the direction of the stop element, said stop element can be lifted away from a valve seat and thereby the stop valve can be opened.

Usually the stop valve also has a magnet unit with which the stop element can be held in the open position after the stop element has been put into this open position manually by pushing the actuation shaft. The magnetic force able to be created with the magnet unit is not sufficiently large however to move the stop element, starting from its closed position, into the open position. As a rule the magnet unit contains a wound coil which is connected to a thermoelement disposed in the area of the gas burner. The electrical voltage created with the thermoelement causes a current to flow through the coil of the magnet unit and thus creates a magnetic force which keeps the stop valve open for as long as a gas flame is burning at the gas burner. When the gas flame is extinguished, the stop valve closes automatically and can only be opened again by manually pushing the actuation shaft.

With these conventional gas valve units there is the problem that the stop element can be moved so far in the opening direction by pushing the actuation shaft that it is against the magnet unit. If the actuation shaft is pushed with great force this can lead to a deformation of the surface of the armature plate which can adversely affect the function of the stop valve. In particular it is possible for the deformed surface of the armature plate no longer to be able to be held in the open position by the magnet unit, because too great an air gap exists between the armature plate and the magnet unit as a result of the deformed surface.

Document WO 2012/080055 shows a gas valve unit for controlling a gas throughput guided to a gas burner of a gas appliance, wherein the gas valve unit has a valve housing and an actuation shaft for adjusting an opening cross section of the gas valve unit and an additional stop valve. A movement of the actuation shaft is able to be transmitted here to the stop valve by means of a linearly displaceable connection element. The connection element in this case has at least one spring. The spring can act here to prevent the shaft being pushed too far.

The necessary stiffness of the spring requires a certain wire diameter of the spring. The wire diameter and the volume of the spring required thereby reduce the throughflow area for the gas throughput to be guided. This results in a falling pressure of the gas throughput. Furthermore the stiffness of the spring must be large enough in order, in normal operation, only to cause a small or very small deformation of the spring. However the stiffness may also not be too high, in order to keep a maximum deformation force below a specific threshold. Overall relatively high design requirements are imposed on the spring.

BRIEF SUMMARY OF THE INVENTION

The underlying object of the present invention is to make available an improved gas valve unit in which the function of the stop valve is permanently safely guaranteed.

This object is achieved in accordance with the invention by the connection element having a plastic bend embodied as overpressure protection.

In accordance with a first aspect of the invention, a gas valve unit for controlling gas throughput guided to a gas burner of a gas device, in particular a gas cooking appliance, is proposed, wherein the gas valve unit has a valve housing and an actuation shaft for adjusting the opening cross section of the gas valve unit and an additional stop valve and wherein the movement of the actuation shaft by means of a linearly-displaceable connection element is able to be transmitted to the stop valve. In this case the connection element has a plastic bend embodied as overpressure protection.

When such a high force is exerted on the connection element that downstream components could be damaged by it, the plastic bend of the connection element kinks and thus prevents these components being damaged. If a force is no longer acting on the actuation shaft the kinking of the plastic bend is released and the plastic bend has its original length again. Simultaneously the plastic bend is designed such that normal pressure forces which do not lead to damage to components are transmitted by the plastic bend. In this case the plastic bend and overall the connection element ensures that, when the actuation shaft is pushed by the operator, the stop valve is opened far enough for the stop element, for example by means of a magnet unit supplied with electrical current by a thermoelement, to be kept open automatically.

It is expedient for the connection element to be suitable for transmission of pressure forces. The term "pressure force" is to be understood here as a force acting linearly.

The use of the plastic bend to prevent the shaft being pushed too hard has the advantage, compared to the use of a spring, that the plastic bend can be manufactured more simply and thus at lower cost. As a result of the reduced space requirement of the plastic bend and the option of its linear arrangement, a further advantage compared to the use of the spring is that this results in a lower pressure loss of the gas throughput to be conveyed.

The gas valve unit is especially part of the manually-actuated multiposition device which consists of a valve part and an adapted ignition safety device. Integrated into the valve part are especially a grip or rotary knob, valves, nozzles and seals. The grip can be pushed in by light pressure. When this is done the ignition safety device is actuated. The on-off valves are pressed onto seals in one or more gas-tight spaces by one or more spring-loaded components and thus prevent the throughflow to the associated openings or seal openings. The spring-loaded components or springs are supported against a ring-shaped disk within a gas-tight space.

In accordance with one form of embodiment the connection element is designed as a one-piece plastic bend. The one-piece plastic bend can be produced simply and thus at very low cost.

In accordance with a further form of embodiment the plastic bend has a first radius if a pressure force engaging on the plastic bend is less than or equal to a specific threshold value. Accordingly the plastic bend has a second radius if a pressure force engaging on the plastic bend is greater than the prespecified threshold value.

The choice of the material for the plastic bend enables the threshold value for the kinking to be predetermined and thus set. Depending on the choice of the first and second radius the plastic bend and thus the connection element can be set for the respective application in the gas valve unit.

In accordance with a further form of embodiment the plastic bend is designed so that it is able to be deformed by kinking from the first radius into the second radius if the pressure force engaging on the plastic bend is greater than the predetermined threshold value.

In accordance with a further form of embodiment the plastic bend is designed so that it is able to be deformed from the second radius into the first radius if the pressure force engaging on the plastic bend is less than the predetermined threshold value.

In accordance with a further form of embodiment a stop element of the stop valves is pre-tensioned in its closed position by means of a closing spring.

This ensures that the stop valve is always closed in its idle position. By manually pushing the actuation shaft the stop valve is able to be opened against the force of the closing spring. In its closed position the stop valve lies against a valve seat of the stop valve and thus prevents gas flowing through the gas valve unit.

In accordance with a further form of embodiment a spring constant of the plastic bend of the connection element is greater than the spring constant of the closing spring. Pushing the actuation shaft therefore initially leads in the first instance to a linear displacement of the connection element and thus to an opening of the stop valve. Only when the stop valve is opened to the maximum and the stop element with the armature plate lies on the iron core of the coil does the force acting on the plastic bend increase, through which the plastic bend kinks when the pre-specified threshold value is exceeded. The maximum force acting on the stop element is thus limited by the plastic bend of the connection element.

In accordance with a further form of embodiment a redirection device is provided, which transmits an axial movement of the actuation shaft into movement of the connection element at an angle thereto.

Such a redirection device is especially required if the size of the gas valve unit is limited in longitudinal direction of the actuation shaft.

In accordance with a further form of embodiment the redirection device has a first slide element, which is disposed on the actuation shaft in the area of the end of the actuation shaft opposite to a control section.

The embodiment of the first slide element as a conical element has the advantage that the spatial extent of the first slide element is independent of the rotational position of the actuation shaft.

In accordance with a further form of embodiment the connection element has a second slide element, which is in contact with the first slide element while the actuation shaft is being pushed.

The second slide element is preferably embodied as a conical element, the central axis of which is essentially disposed at right angles to the actuation shaft and the tip of which points in the direction of the first slide element. During an axial displacement of the first slide element the two slide elements slide away from one another and the second slide element—and thus the connection element—moves in the axial direction of the second slide element.

In accordance with a further form of embodiment the second slide element is embodied as part of the end of the connection element facing towards the actuation shaft. Through this an axial movement of the second slide element automatically causes an axial movement of the connection element.

In accordance with a further form of embodiment the connection element, at its end facing away from the actuation shaft, has a pin for actuating the stop element and at least one guide pin, especially a horizontal guide pin and a vertical guide pin.

Through the use of the pin, which has a relatively small contact surface, the influence on the stop element is minimized. The guide pin or the guide pins are configured to guide the movement of the connection element in the gas valve unit.

In accordance with a second aspect of the invention a gas valve is proposed which has at least one gas valve unit according to the first aspect or according to a form of embodiment of the first aspect.

In accordance with a third aspect of the invention a gas appliance, especially a gas cooker, is proposed which has a gas valve according to the second aspect.

Further possible implementations of the invention also include combinations not explicitly cited of features or forms of embodiment described previously or below in relation to the exemplary embodiments. In this case the person skilled in the art will also add individual aspects as improvements or additions to the respective basic form of the invention.

BRIEF DESCRIPTION OF THE DRAWINGS

Further advantageous embodiments and aspects of the invention are the subject matter of the dependent claims as well as the exemplary embodiments of the invention described below. The invention is also explained in greater detail on the basis of preferred forms of embodiment, which refer to the enclosed figures, in which:

DETAILED DESCRIPTION OF EXEMPLARY EMBODIMENTS OF THE PRESENT INVENTION

Figure 1:
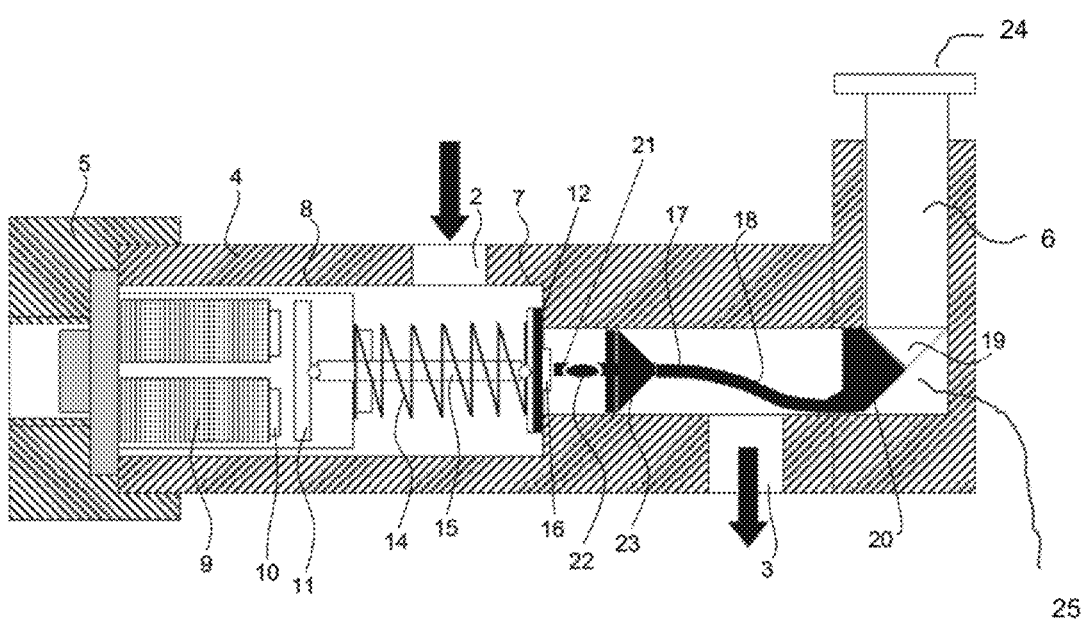
FIG. 1 shows a sectional view of a gas valve unit.

FIG. 1 shows a gas valve unit 1 of a gas valve, which is suitable for controlling gas throughput guided to a gas burner of a gas cooking appliance.

The gas valve unit 1 has a gas input 2, by which it is connected for example to a main gas line of a gas cooking appliance. The gas provided for burning is at a constant pressure, of for example 20 mbar to 50 mbar, at the gas input 2. Connected to a gas output 3 of the gas valve unit 1 is a gas line leading for example to a gas burner of the gas cooking appliance. The gas input 2 is connected via a gas output space of the gas valve unit 1 to the input side of the plurality of on-off valves (not shown). By opening the on-off valves the gas input 2 is connected in each case with the gas output area.

The gas valve unit 1 has a valve housing 4, a union nut 5 able to be attached to the valve housing 4 and an actuation shaft 6, by means of which the user can open and close a stop valve 7 which is disposed between the gas input 2 and the gas output. The stop valve 7 comprises a magnet insert 8, which comprises a coil 9, an iron core 10 and an armature plate 11. For stopping the flow between the gas input 2 and the gas output 3 the stop valve 7 has a stop element 12, which has a sealing receptacle 13 and a pressure surface 16 for initiating a lift. The stop element 12 of the stop valve 7 is pre-tensioned in the closed position by means of a closing spring 14. A pressure pin 15 is provided between the stop element 12 and the magnet insert 5 in the inner volume of the closing spring 14.

A movement of the actuation shaft 6 is able to be transmitted to the stop valve 7 by a linearly-displaceable connection element 17. To this end the gas valve unit 1 has a redirection device 25, which transfers an axial movement of the actuation shaft 6 into an axial movement of the connection element 17 at an angle thereto. Thus if the actuation shaft 6 is actuated by the user, for example pushed downwards, the stop valve 7 will be opened by an axial movement of the connection element 17. The connection element 17 then acts on the pressure surface 16 to initiate a lift and thus acts against the force of the closing spring 14. The redirection device 25 in this case preferably has a first slide element 19, which is disposed on the actuation shaft 6 in the area of the end of actuation shaft 6 opposite the control section 24. A displaceable second slide element 20 actively connected to the first slide element 19 is part of the connection element 17. The second slide element 20, at least while the actuation shaft 6 is being pushed, is in contact with the first slide element 19. The second slide element 20 is embodied as part of the end of the connection element 17 facing towards the actuation shaft 6 (see also FIG. 2).

Figure 2:
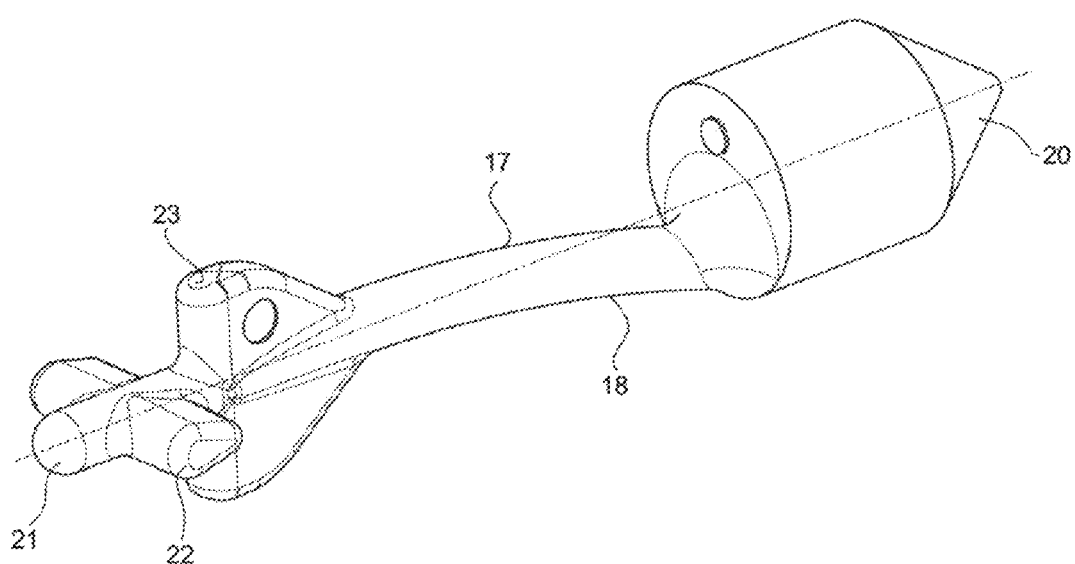
FIG. 2 shows a view of a connection element.

In this context FIG. 2 depicts a detailed view of the connection element 17. The connection element 17 has a plastic bend embodied as an overpressure protection 18. The plastic bend 18 kinks as from a specific threshold value of the pressure force acting on it and thus prevents potential damage to downstream parts. In this case the plastic bend 18 has a first radius if the pressure force acting on the plastic bend 18 is less than or equal to the specific threshold value. However if the pressure force acting on the plastic bend 18 is greater than the predetermined threshold value, the plastic bend 18 kinks and assumes a second radius. Through suitable choice of material and stiffness of the plastic bend 18 the radius is embodied such that it is at a maximum in respect of the existing installation space in the gas valve 1. By setting a maximum second radius in the installation space a preferred deformation direction is prespecified and the critical pressure force, the pre-determined threshold value, is stable.

Figure 3:
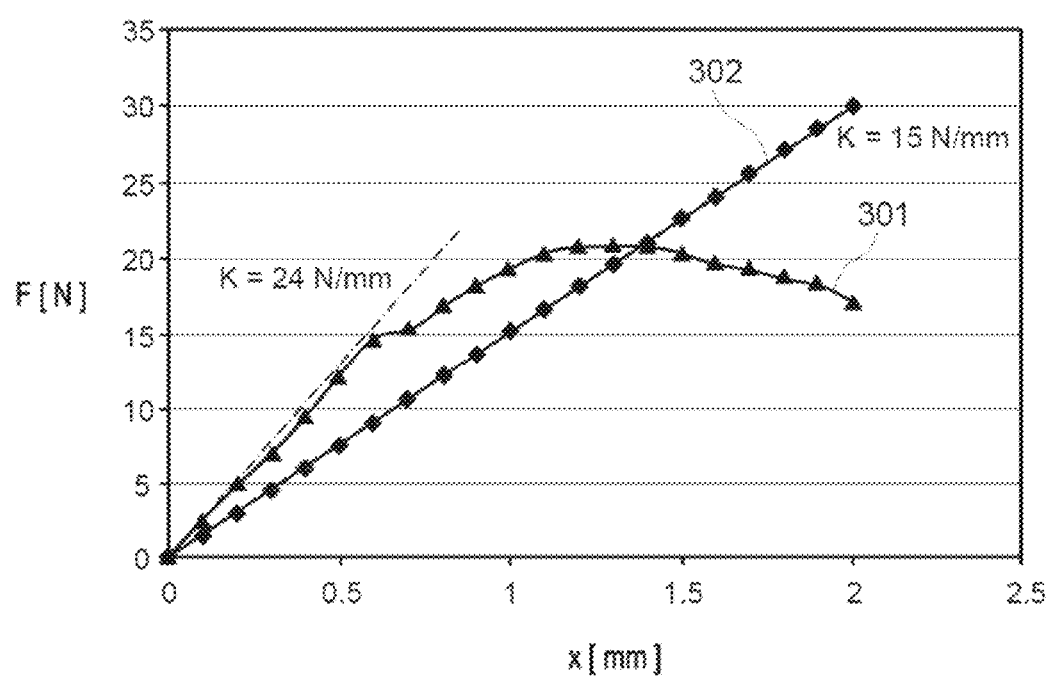
FIG. 3 shows a diagram to illustrate the pressure-dependent deformations of different connection elements.

In this context FIG. 3 shows a diagram to illustrate the pressure-dependent deformations of different connection elements. In this figure the curve 301 shows the deformation of the present connection element with plastic bend, while curve 302 shows a conventional connection element with spring. The x-axis of FIG. 3 illustrates the deformation x in millimeters and the y-axis shows the pressure force F in Newton. The curve 302 for the spring corresponds to an original straight line with a stiffness K of 15 N/mm (K=15 N/mm).

The curve 301 illustrates that the pre-specified threshold value for the plastic bend lies at somewhat more than 20 N. In the linear range, which shows the normal operation of the plastic bend before it kinks, the slope of the curve 301 is greater than that of curve 302 (K=24 N/mm). Consequently the deformation in this normal operation is less than for the spring. By comparison the spring, with constant stiffness, has a maximum force of around 20 N with a deformation of 1.5 mm, but with lower stiffness.

Furthermore the connection element 17, on its end facing away from the actuation shaft 6, has a pin 21 for actuation of the stop element 12 as well as a horizontal guide pin 22 and a vertical guide pin 23. The guide pins 22 and 23 are not in the same plane, in order to minimize the pressure loss. The small cross section of the plastic bend 18 relative to the volume of the installation space especially contributes to minimizing the pressure loss. Thus the pressure loss caused by the present plastic bend is far less than with a spring as overpressure protection.

LIST OF REFERENCE CHARACTERS

1 Gas valve unit
2 Gas input
3 Gas output
4 Valve housing
5 Union nut
6 Actuation shaft
7 Stop valve
8 Magnet insert
9 Coil
10 Iron core
11 Armature plate
12 Stop element
13 Seal receptacle
14 Closing spring
15 Pressure pin
16 Pressure surface for lift initiation
17 Connection element
18 Overpressure protection
19 First slide element
20 Second slide element
21 Pin
22 Guide pin
23 Guide pin
24 Control Section
25 Redirection Device
F Pressure force
K Stiffness
x Deformation

The invention claimed is:
1. A gas valve unit for controlling a gas throughput routed to a gas burner of a gas appliance, comprising:
   a valve housing;
   an actuation shaft configured to set an opening cross section of the gas valve unit;
   a stop valve having a stop element; and
   a linearly-displaceable connection element configured to transmit a movement of the actuation shaft to the stop valve, the connection element having a plastic bend forming an overpressure protection, a pin for actuating the stop element, and at least one guide pin.

2. The gas valve unit of claim 1, constructed for controlling the gas throughput routed to the gas burner of a gas cooker as the gas appliance.

3. The gas valve unit of claim 1, wherein the connection element is embodied as a one-piece plastic bend.

4. The gas valve unit of claim 1, wherein the plastic bend has a first radius when a pressure force exerted upon the plastic bend is less than or equal to a specific threshold value, and a second radius when the pressure force exerted upon the plastic bend is greater than the prespecified threshold value.

5. The gas valve unit of claim 4, wherein the plastic bend is capable of being deformed by kinking from the first radius into the second radius when the pressure force exerted upon the plastic bend is greater than the prespecified threshold value.

6. The gas valve unit of claim 4, wherein the plastic bend is capable of being deformed from the second radius into the first radius when the pressure force exerted upon the plastic bend is less than the specific threshold value.

7. The gas valve unit of claim 1, further comprising a closing spring configured to maintain the stop valve under tension so as to seek a closed position.

8. The gas valve unit of claim 7, wherein the plastic bend of the connection element has a spring constant which is greater than a spring constant of the closing spring.

9. The gas valve unit of claim 1, further comprising a redirection device configured to transfer an axial movement of the actuation shaft into an angled axial movement of the connection element.

10. The gas valve unit of claim 9, wherein the redirection device has a first slide element which is disposed on the actuation shaft in an area of an end of the actuation shaft in opposition to a control section.

11. The gas valve unit of claim 10, wherein the connection element has a second slide element which, at least during pushing of the actuation shaft, is in contact with the first slide element.

12. The gas valve unit of claim 11, wherein the connection element has an end which faces towards the actuation shaft, said second slide element being formed as part of the end of the connection element.

13. The gas valve unit of claim 7, wherein the connection element has an end which faces away from the actuation shaft, and the at least one guide pin is arranged on the end.

14. The gas valve unit of claim 7, wherein the connection element has an end which faces away from the actuation shaft, and the at least one guide pin further comprising a horizontal guide pin, and a vertical guide pin, said horizontal and vertical guide pins being arranged on the end.

15. A gas valve, comprising at least one gas valve unit for controlling a gas throughput routed to a gas burner of a gas appliance, said gas valve unit comprising a valve housing, an actuation shaft configured to set an opening cross section of the gas valve unit, a stop valve having a stop element, and a linearly-displaceable connection element configured to transmit a movement of the actuation shaft to the stop valve, the connection element having a plastic bend forming an overpressure protection, a pin for actuating the stop element, and at least one guide pin.

16. The gas valve of claim 15, wherein the connection element is embodied as a one-piece plastic bend.

17. The gas valve of claim 15, wherein the plastic bend has a first radius when a pressure force exerted upon the plastic bend is less than or equal to a specific threshold value, and a second radius when the pressure force exerted upon the plastic bend is greater than the prespecified threshold value.

18. The gas valve of claim 17, wherein the plastic bend is capable of being deformed by kinking from the first radius into the second radius when the pressure force exerted upon the plastic bend is greater than the prespecified threshold value.

19. The gas valve of claim 17, wherein the plastic bend is capable of being deformed from the second radius into the first radius when the pressure force exerted upon the plastic bend is less than the specific threshold value.

20. The gas valve of claim 15, further comprising the gas valve unit including a closing spring configured to maintain the stop valve under tension so as to seek a closed position.

21. The gas valve of claim 20, wherein the plastic bend of the connection element has a spring constant which is greater than a spring constant of the closing spring.

22. The gas valve of claim 15, wherein the gas valve unit includes a redirection device configured to transfer an axial movement of the actuation shaft into an angled axial movement of the connection element.

23. The gas valve of claim 22, wherein the redirection device has a first slide element which is disposed on the actuation shaft in an area of an end of the actuation shaft in opposition to a control section.

24. The gas valve of claim 23, wherein the connection element has a second slide element which, at least during pushing of the actuation shaft, is in contact with the first slide element.

25. The gas valve of claim 24, wherein the connection element has an end which faces towards the actuation shaft, said second slide element being formed as part of the end of the connection element.

26. The gas valve of claim 20, wherein the connection element has an end which faces away from the actuation shaft, and the at least one guide pin is arranged on the end.

27. The gas valve of claim 20, wherein the connection element has an end which faces away from the actuation shaft, the at least one guide pin further comprising a horizontal guide pin, and a vertical guide pin, said horizontal and vertical guide pins being arranged on the end.

28. A gas appliance, comprising:
a gas burner; and
a gas valve including at least one gas valve unit for controlling a gas throughput routed to the gas burner, said gas valve unit comprising a valve housing, an actuation shaft configured to set an opening cross section of the gas valve unit, a stop valve having a stop element, and a linearly-displaceable connection element configured to transmit a movement of the actuation shaft to the stop valve, the connection element having a plastic bend forming an overpressure protection, a pin for actuating the stop element, and at least one guide pin.

29. The gas appliance of claim 28, constructed in the form of a gas cooker.

* * * * *